United States Patent
Lakhov et al.

(10) Patent No.: US 10,180,252 B2
(45) Date of Patent: Jan. 15, 2019

(54) STEAM GENERATOR COOLANT HEADER WITH U-SHAPED TUBES OF A HORIZONTAL HEAT-EXCHANGE BUNDLE AND METHODS OF ITS MANUFACTURE

(71) Applicant: JOINT STOCK COMPANY "EXPERIMENTAL AND DESIGN ORGANIZATION "GIDROPRESS" AWARDED THE ORDER OF THE RED BANNER OF LABOUR AND CZSR ORDER OF LABOUR", Podolsk Moskovskaya (RU)

(72) Inventors: Dmitriy Aleksandrovich Lakhov, Podolsk Moskovskaya (RU); Aleksey Vladimirovich Safronov, Podolsk Moskovskaya (RU); Aleksandr Grigorevich Konyushkov, Podolsk Moskovskaya (RU); Dimitriy Evgenevich Alekseev, Klimovsk Moskovskaya (RU); Aleksandr Evegenevich Gerontiev, Moscow (RU)

(73) Assignee: Joint Stock Company "Experimental and Design Organization "Gidropress" Awarded the Order of the Red Banner of Labour and CZSR Order of Labour" (RU)

( * ) Notice: Subject to any disclaimer, the term of this patent is extended or adjusted under 35 U.S.C. 154(b) by 0 days.

(21) Appl. No.: 15/535,371

(22) PCT Filed: Nov. 16, 2015

(86) PCT No.: PCT/RU2015/000787
§ 371 (c)(1),
(2) Date: Jun. 12, 2017

(87) PCT Pub. No.: WO2016/093738
PCT Pub. Date: Jun. 16, 2016

(65) Prior Publication Data
US 2017/0321881 A1    Nov. 9, 2017

(30) Foreign Application Priority Data

Dec. 12, 2014   (RU) ................... 2014150428

(51) Int. Cl.
*F22B 1/02*       (2006.01)
*F28F 1/00*       (2006.01)
(Continued)

(52) U.S. Cl.
CPC .............. *F22B 1/023* (2013.01); *B23P 15/26* (2013.01); *F22B 1/02* (2013.01); *F22B 29/064* (2013.01); *F28F 1/00* (2013.01)

(58) Field of Classification Search
CPC ...... F22B 37/483; F22B 1/025; F22B 37/228; F22B 37/02; F22B 1/02; B23P 15/26; F28D 7/06
See application file for complete search history.

(56) References Cited

U.S. PATENT DOCUMENTS

2008/0223563 A1*   9/2008  Penny ................... B21D 53/04
                                                   165/166
2014/0014048 A1*   1/2014  Wepfer .................. F22B 37/22
                                                   122/32

(Continued)

FOREIGN PATENT DOCUMENTS

RU     2065109 C1    8/1996
RU     2068149 C1   10/1996
(Continued)

*Primary Examiner* — Gregory A Wilson
(74) *Attorney, Agent, or Firm* — Colin P. Cahoon; Shaukat A. Karjeker; Carstens & Cahoon, LLP (57) ABSTRACT

This invention relates to electric power industry, and can be used in horizontal steam generators for nuclear power plants (Continued)

(NPP) with a water-water energetic reactor (VVER). We claim a steam generator primary circuit coolant header with U-shaped tubes of a horizontal heat-exchange bundle designed as a thick-wall welded vessel with a perforated central cylindrical part designed so as to allow installation and fastening of a U-shaped heat-exchange tube bundle in the same, wherein the tubes are grouped into banks and separated by vertical inter-tubular tunnels, a lower cylindrical part designed so as to allow welded connection with the steam generator vessel connection pipe, and an upper cylindrical part with a conical adapter to the flange connection of the manhole with a lid, wherein primary circuit header outer diameter $D_{head}$ in the central part is selected based on formula.

The technical result of the invention involves assurance of strength of the header wall bridges between holes for fastening of heat-exchange tubes and leaktightness of heat-exchange tube connections with the header assuming that the outer surface of the perforated header part is more efficiently (fully) used for tubing.

15 Claims, 7 Drawing Sheets

(51) Int. Cl.
  B23P 15/26 (2006.01)
  F22B 29/06 (2006.01)

(56) References Cited

U.S. PATENT DOCUMENTS

| | | | |
|---|---|---|---|
| 2015/0226420 A1* | 8/2015 | Bunce | F22B 1/162 376/378 |
| 2016/0003551 A1* | 1/2016 | Fujita | F28F 9/0131 60/39.182 |

FOREIGN PATENT DOCUMENTS

| | | |
|---|---|---|
| RU | 2138715 C1 | 9/1999 |
| RU | 30928 U1 | 7/2003 |
| RU | 2379583 C1 | 1/2010 |
| RU | 2431693 C1 | 10/2011 |
| RU | 2524461 C2 | 7/2014 |

* cited by examiner

STEAM GENERATOR COOLANT HEADER WITH U-SHAPED TUBES OF A HORIZONTAL HEAT-EXCHANGE BUNDLE AND METHODS OF ITS MANUFACTURE

CROSS-REFERENCE TO RELATED APPLICATIONS

This application is a US 371 Application from PCT/RU2015/000787 filed Nov. 16, 2015, which claims priority to Russia Application 2014150428 filed Dec. 12, 2014, the technical disclosures of which are hereby incorporated herein by reference.

FIELD OF THE INVENTION

This invention relates to electric power industry, and can be used in horizontal steam generators for nuclear power plants (NPP) with a water-water energetic reactor (VVER).

BACKGROUND OF THE INVENTION

A steam generator is an essential component of reactor plant primary circuit. In its turn, connection of a primary circuit coolant header with a heat-exchange tube bundle is the most complicated steam generator assembly for manufacture. High inter-circuit density requirements are imposed on this assembly. That means that the coolant header connection assembly design shall exclude the possibility of damage of heat-transferring and other components, if their loss of tightness leads to primary circuit radioactive water getting inside the secondary circuit steam-water coolant circulating through the turbine, condensers, heaters and other similar structural components of the NNP reactor plant with potential radioactive substance release to the environment.

The primary circuit coolant header used in horizontal steam generators is generally a thick-walled cylindrical vessel with its diameter and thickness varying along the length of the said vessel. The central cylinder part of headers has through holes for fastening the ends of heat-exchange tubes. The lower cylindrical part of the header is designed with a possibility of weld connection with the steam generator vessel connection pipe and the upper cylindrical part of header is equipped with a hatch (manhole) for access inside and has a conical adapter to the flange connection of the manhole with its lid.

Main problems that can arise during steam generator operation are related to provision of structural integrity of flange connectors and structural integrity of primary circuit coolant headers.

The most labor-consuming and complex operation during steam generator manufacture, from the technological point of view, is the connection of a heat-exchange tube bundle to primary circuit coolant headers involving drilling a large number of closely spaced deep through holes on a limited area of the header side wall followed by leak-tight insertion of heat-exchange tubes in the same. A large number of closely spaced deep through holes reduces the strength of the header, thus, limiting the number of heat-exchange tubes that can be placed in the steam generator with the specified side wall thickness, and if the number of heat-exchange tubes, a significant increase of the header side wall thickness is required.

The above problems are solved differently within the technical background.

Thus, an method to solve the problem of structural integrity of flange connectors is disclosed in USSR Inventor's Certificate No. 1267847, issued on Jan. 10, 1996, IPC: F22B1/02, describing a steam generator assembly comprising a primary circuit heating coolant header with s flange connector located in the steam generator vessel neck forming an annular region. An emergency primary circuit heating coolant flow arrester is installed in the region separating the upper cavity the neck from the rest of the vessel, and it is designed as a seal ring with a cross-section in the shape of a downwards tapered wedge.

Another sealing device used in NPP reactor plant assemblies is disclosed in Russian Utility Model Patent No. 84491, IPC F16J15/12, issued on Jul. 10, 2009. A sealing gasket made of two L-shaped cross section split stop rings with a seal element made of pressed expanded graphite foil in between. Use of expanded graphite foil gaskets in sealing assemblies allows to decrease the probability of reactor plant primary circuit coolant leakage when they are used both for cylindrical and end surfaces of the seal assembly.

Processing technology for deep through holes in steam generator headers, tube sheets and other equipment components of nuclear and petrochemical plants is described in Russian Patent No. 2514359, issued Apr. 27, 2014, IPC B23B35/00. The method includes preliminary drilling of holes with a drilling tool consisting of a head and a stem. At the same time cutting fluid is fed under pressure at least 4 MPa into the gap between the machined surface and the drilling tool and chips are removed by the cutting fluid flow through the inner channels of the head and the stem. Final machining of the surface is performed by reamer installed on the same stem, while chips are removed through the drilled hole forwards in the direction of reaming. Removal of the reamer from the hole is combined with burnishing of the hole surface, while the reamer is rotated at a speed exceeding the rotation speed during reaming up to 4 times and the reamer removal speed exceeds the working feed by 5 to 7%. The use of this method allows to remove a surface layer with residual tension stress, decrease hole surface roughness, increase operation reliability of the heat-exchange equipment connection.

Another invention disclosed Russian Patent No. 2524461, issued on Jul. 27, 2014, IPC B21D39/06, solves the problem heat-exchange pipe end fastening in tube-shaped steam generator headers. According to said invention, tube ends are pre-expanded on the inner surface of the header, tubes are welded, hydraulic expansion within the header thickness is performed, the front end if expanded in the area adjacent to the inner surface followed by mechanical flaring in the area adjacent to the outer surface of the header. The tube front end is expanded by mechanical rolling with 3-roller expanders with torque limitation on the drive shaft. Then one- or two-transition hydraulic expansion is performed. The diameter difference between the mechanical rolling area and the area of hydraulic expansion shall retain up to 0.75÷1% of the heat-exchange tube outer diameter. Application of the invention increases reliability and durability of the connection. The method described is rather labor-consuming and relates only to one operation of heat-exchange tube fastening in the header, and does not cover the full VVER NPP horizontal steam generator primary circuit coolant header manufacture and assembly process.

The closest analog of the proposed technical solution is the one disclosed in Utility Model Patent RU30928 issued on Jul. 10, 2003, IPC: F22B1/02. The utility model relates to manufacture process for a steam generator comprising a vessel and a heat-exchange assembly with inlet and outlet primary circuit coolant headers with a horizontal heat-exchange tube bundle connected to the same. Horizontal heat-exchange tubes are installed at a horizontal and vertical relative spacing of (1.44+−1.55)·d and (1.35+−1.40)·d respectively, where d is the tube diameter. The said spacing range for heat-exchange tube installation is applicable, without limitation, to tight arrangement of heat-exchange bundle tubes, however the issue of heat-exchange tube positioning in a coolant header in case of the said tight arrangement of the heat-exchange bundle remains unsolved. That is, if tight arrangement of heat-exchange tubes is used with horizontal spacing 1.44·d and vertical spacing 1.35·d according to this utility model, coolant header perforated section strength and ease of insertion of heat-exchange tubes into the header during creation of heat-exchange bundle banks are not guaranteed.

INVENTION DISCLOSURE

The purpose of the claimed invention is to create a horizontal steam generator assembly comprising a primary circuit coolant header with a bundle of U-shaped heat-exchange tubes while maintaining the header strength, tightness and processability of heat-exchange tube fastening in the header and increasing the steam generator heat-exchange tube filling level.

The technical result of the invention consists in the guaranteed strength of header wall cross connections between the holes for heat-exchange tube mounting and tightness of connection between heat-exchange tubes and the header while the outer surface of the header perforated section is used for tube insertion at maximum efficiency.

To solve the task at hand, we claim a steam generator primary circuit coolant header with U-shaped tubes of a horizontal heat-exchange bundle designed as a thick-wall welded vessel with a perforated central part designed so as to allow installation and fastening of a U-shaped heat-exchange tube bundle in the same, wherein the tubes are grouped into banks and separated by vertical inter-tubular tunnels, a lower cylindrical part designed so as to allow weld connection with the steam generator vessel connection pipe, and an upper cylindrical part with a conical adapter to the flange connection of the manhole with a lid, wherein primary circuit header outer diameter $D_{head}$ in the central part is selected based on the following ratio:

$$2 \cdot \left[ \frac{(d+5.5) \cdot (n_1 + n_2)}{\pi} + 100 \right] \leq D_{head} \leq$$

$$2 \cdot \left[ \sqrt{2} \cdot (n_1 - 1) \cdot S_\Gamma + \frac{\sqrt{2}}{2} \cdot B_2 - \frac{\sqrt{2}}{4} \cdot (n_1 + n_2) \cdot S_\Gamma - R_\Gamma \cdot tg\left(\frac{\pi}{8}\right) + 100 \right]$$

where: $S_h$ is the spacing between heat-exchange tubes in the horizontal heat-exchange bundle row, mm, $B_2$ is the width of the heat-exchange bundle opposite to the coolant header, mm, d is the outer heat-exchange tube diameter, mm, $n_1$ and $n_2$ indicate the quantity of tubes in the horizontal row of the smaller and bigger heat-exchange tube banks, accordingly, mm, $R_b$ is the minimum bend radius of the heat-exchange bundle tubes, mm, provided that holes for fastening of heat-exchange tubes are staggered in the central cylinder part of the header and the distance between edges of the adjacent holes is not less than 5.5 mm along the inner surface of the header.

The distance between the hole edges on the inner surface of the coolant header vessel is at least 5.5 mm, which allows to weld the heat-exchange tube end along its full circular length ensuring connection leak-tightness.

Heat-exchange tubes fixed in the holes on the header side wall are seamless solid-drawn austenitic stainless steel pipes.

The heat-exchange bundle heat-exchange tubes are grouped into banks with 100 to 250 mm wide vertical inter-tubular tunnels.

The heat-exchange tubes bundle is filled with heat-exchange tubes from bottom upwards continuously with vertical gaps between adjacent tubes not exceeding the vertical spacing of tubes in the bundle.

The holes in the central cylindrical part of the header vessel fill its external surface are from the bottom to the top and form the drilling area. On the header development on the outer diameter, the said drilling area is limited at the bottom by a polyline in the shape of a symmetrical wedge. The wedge has a flat point with a horizontal section. The horizontal section size is at least $3(d_{hol}+6)$ mm. The availability and size of the horizontal section are selected to meet the steam generator reliability requirement due to lower residual stresses in the header. A drilling area shaped as a pointed wedge might form a stress riser, i.e. contribute to crack initiation in the header vessel, therefore, the said pointed drilling area configuration is not used in the claimed header design.

The manhole flange connection with its lid is furnished with an expanded graphite gasket, in particular, a thermal expanded graphite gasket, designed as a pressed graphite foil ring reinforced with a stainless steel band. Flange connection sealed with thermal expanded graphite gaskets allows to reduce preload efforts on the flange connection and improve coolant header stressed state.

The second object of the claimed invention is manufacture method for a steam generator primary circuit coolant header with U-shaped tubes of a horizontal heat-exchange bundle including prefabrication of two complex forgings and U-shaped heat-exchange tubes, assembly and welding of the forging, drilling through holes in the header central cylindrical part, assembly of a heat-exchange bundle of U-shaped heat-exchange tubes grouped into banks and separated by vertical inter-tubular tunnels in the bundle, fastening of each heat-exchange tube in the primary circuit header holes by rolling and welding on the header internal surface, wherein primary circuit header outer diameter $D_{head}$ in the central part is selected based on the following ratio:

$$2 \cdot \left[ \frac{(d+5.5) \cdot (n_1 + n_2)}{\pi} + 100 \right] \leq D_{head} \leq$$

$$2 \cdot \left[ \sqrt{2} \cdot (n_1 - 1) \cdot S_\Gamma + \frac{\sqrt{2}}{2} \cdot B_2 - \frac{\sqrt{2}}{4} \cdot (n_1 + n_2) \cdot S_\Gamma - R_\Gamma \cdot tg\left(\frac{\pi}{8}\right) + 100 \right],$$

where: $S_h$ is the spacing between heat-exchange tubes in the horizontal heat-exchange bundle row, mm, $B_2$ is the width of the heat-exchange bundle opposite to the coolant header, mm, d is the outer heat-exchange tube diameter, mm, $n_1$ and $n_2$ indicate the quantity of tubes in the horizontal row of the smaller and bigger heat-exchange tube banks, accordingly, mm, $R_b$ is the minimum bend radius of the heat-exchange bundle tubes, mm, provided that holes for fastening of heat-exchange tubes are staggered in the central cylinder part of the header and the distance between edges of the adjacent holes is not less than 5.5 mm along the inner surface of the header.

According to the claimed method, the heat-exchange tubes are secured in the holes in the central cylindrical part of the header by round-welding of the tube ends to the inner surface of the header, followed by hydraulic expansion of the heat-exchange tubes over header wall thickness and mechanical curling near the external surface of the header until the gap between the header vessel and the heat-exchange tube inserted therein is closed.

A heat-exchange bundle is filled with heat-exchange tubes uniformly from bottom upwards with vertical gaps between adjacent tubes not exceeding the vertical spacing of tubes in the bundle, when the header is installed in the steam generator vessel, the height of its drilling area shall not exceed the arrangement limits set for the upper row of heat-exchange bundle tubes in the steam generator.

When the coolant header is assembled with a heat-exchange tube bundle to be inserted in the holes drilled in the central part of the header, heat-exchange tube bend radii shall be at least 60 mm, and preferably at least 100 mm. Increased bend radii allow to insert a electromagnetic probe in each heat-exchange tube for eddy current testing of the tube integrity and connection quality. The possibility to perform a 100% eddy current test of the heat-exchange tube integrity and quality of their connection with the coolant header improves the steam generator performance, reliability and durability.

To ensure the coolant header strength requirements are met, it is required additionally that the drilling area external surface exceeds the hole area by at least 20% when holes are drilled in the header central cylindrical part.

The claimed invention allows to select the coolant header outer diameter within the range of technical result achievement. The lower value of the derived header diameter range can still guarantee the processability of tube fastening in the header where the tube ends are round-welded to the header on the external surface of the header vessel and its strength. The upper value of the header diameter range allows to guarantee steam generator assembly processability, namely, the possibility to insert all heat-exchange bundle tubes in the coolant header holes.

CORROBORATION OF ACTUAL REDUCTION TO PRACTICE

Figure 1:
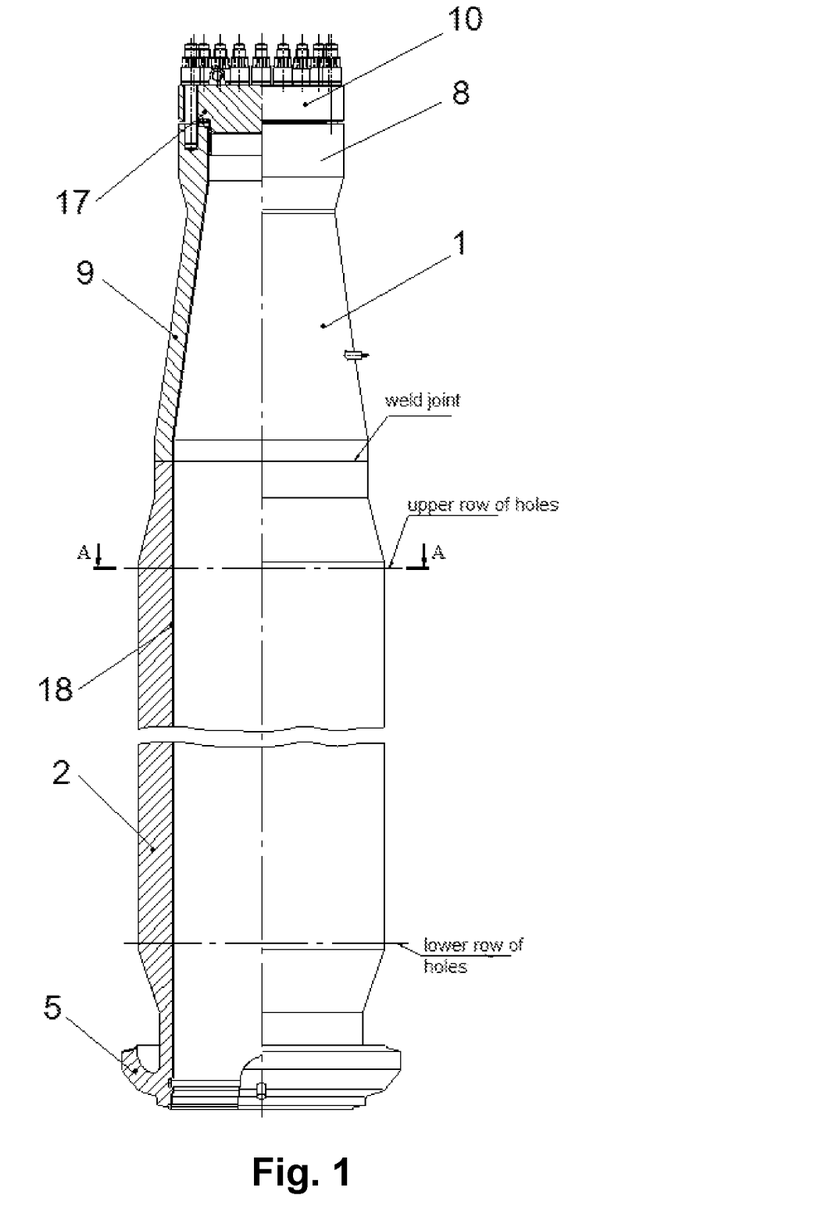
FIG. 1 shows a sectional view of the primary circuit coolant header vessel.
Figure 7:
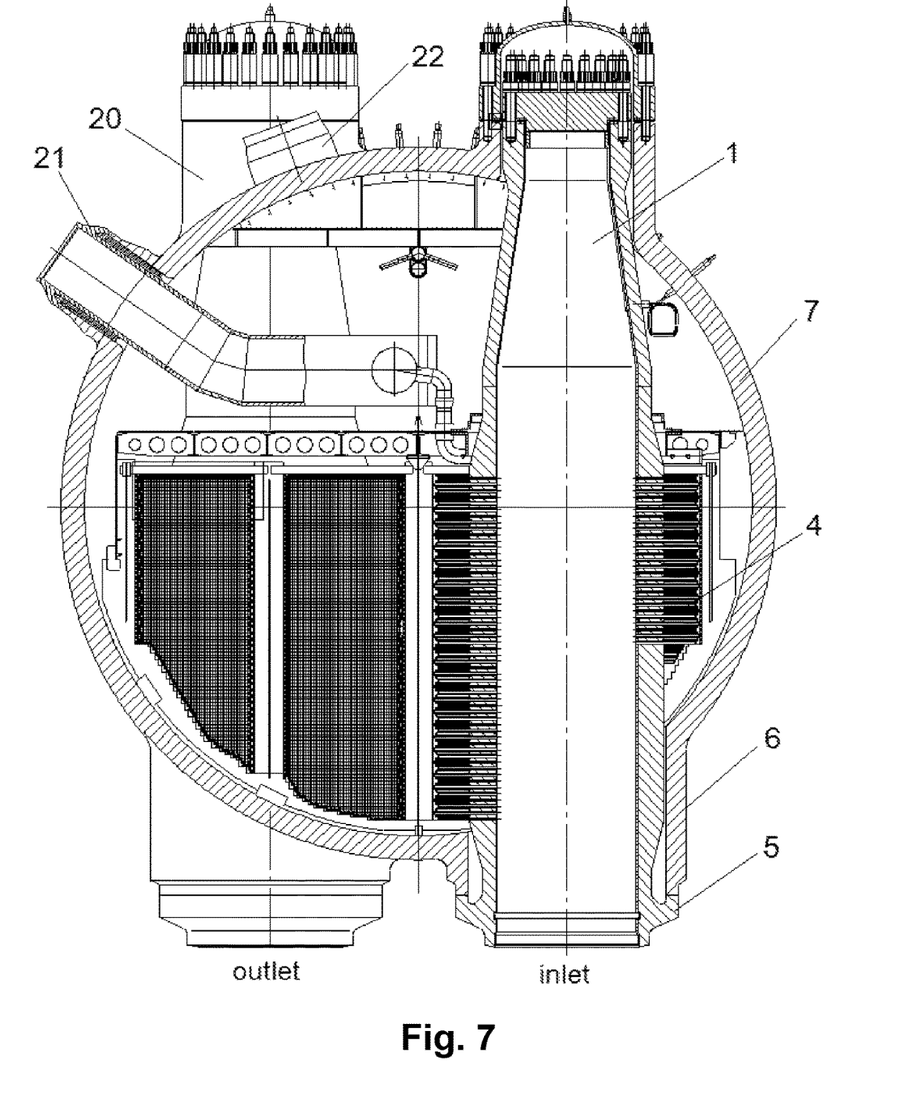
FIG. 7 shows a cross section of the horizontal steam generator vessel.
Figure 8:
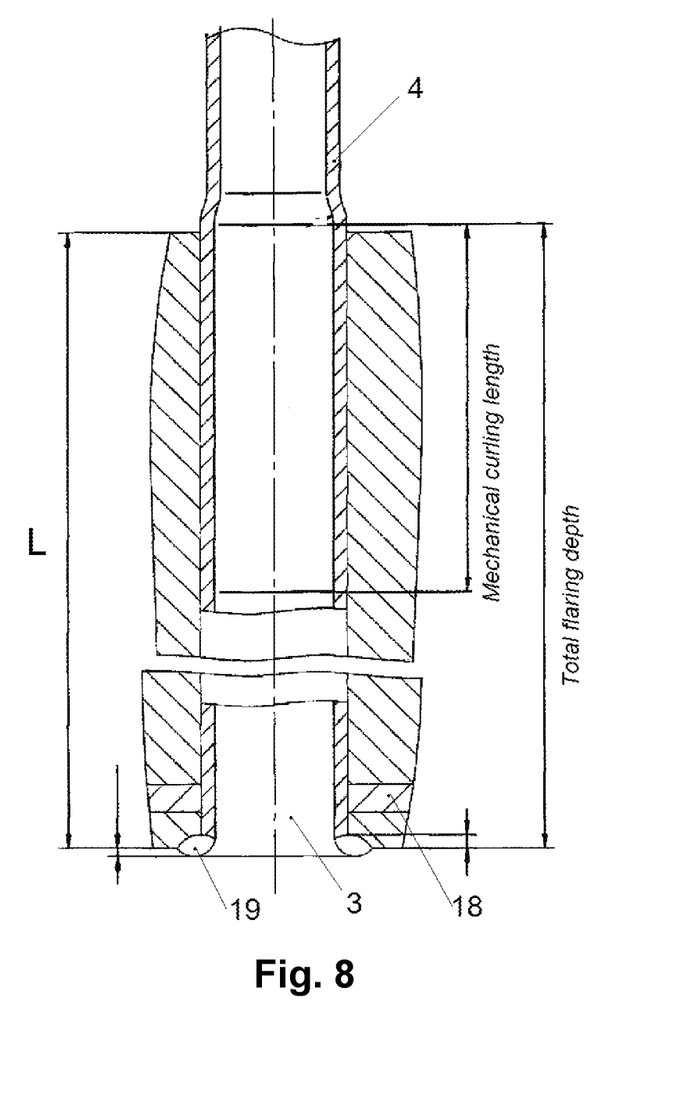
FIG. 8 shows insertion of a heat-exchange tube in a hole in the header side wall.

As shown in FIG. 1, horizontal steam generator primary circuit coolant header 1 has a body in the form of a thick-shaped vessel. The central cylindrical part 2 of the header has deep holes 3 shown in FIGS. 2 and 3 in section that are used to secure heat-exchange tube 4 ends therein as shown in FIGS. 4, 5 and 8. The lower cylindrical part 5 of the header is designed as shown in FIG. 7 with a possibility to connect with the steam generator vessel 7 connection pipe 6 by welding, and the upper part 8 of the header has a flange connection for access inside. It is designed with a conical adapter 9 to the flange connection of the manhole with its lid 10.

Header 1 has its central cylindrical part 2 with a large number of perforated holes 3 designed so as to allow to install and secure a bundle of U-shaped heat-exchange tubes 4 grouped into banks 11 and 12 and separated by vertical inter-tubular tunnels 13 in the said holes 3. Holes 3 are staggered on the central cylindrical part 2 of the header.

The holes 3 in the central cylindrical part 2 of the header vessel 1 fill its external surface are from the bottom to the top. The limits of the upper and lower rows of holes 3 are shown by horizontal dash-dot lines in FIG. 1. In FIG. 5 showing header 1 development on the outer diameter, the said drilling area 14 is shown limited at the bottom by a polyline 15 in the shape of a symmetrical wedge. The wedge limiting the drilling area at the bottom has a flat point 16 with a horizontal section. The horizontal section size is at least $3(d_{hol}+6)$ mm. The availability and size of the horizontal section are required to eliminate the stress riser in the header vessel area and increase header vessel strength and reliability.

The flange connection of the manhole with its lid is equipped with a thermal expanded graphite sealing gasket 17.

The assembly method for a steam generator comprising a primary circuit coolant header 1 with U-shaped tubes 4 of a horizontal heat-exchange bundle includes prefabrication of two complex forgings. The first one is designed to form lower 5 and central 2 cylindrical parts of the header 1 vessel. The second forging forms flanged upper conical part 8 of the header 1. Then the forgings are assembled and welded. Two-layer anti-corrosion build-up 18 is applied to the header vessel internal surface. In addition, the specified number of U-shaped heat-exchange tubes are manufactured. Holes 3 are drilled under the established procedure in the central cylindrical part 2 of the header 1, the heat-exchange bundle is assembled with U-shaped heat-exchange tubes 4 grouped into banks 11 and 12 separated by vertical inter-tubular tunnels 13. Each heat-exchange tube 4 is inserted in its corresponding hole 3 in header 1 vessel. Tubes 4 are secured in the primary circuit header holes by rolling followed by round-welding (ring welding) of the tube 4 end to the header 1 internal surface. The said ring weld joint 19 is shown in FIG. 8. Then hydraulic expansion of each heat-exchange tube 4 is performed over header wall thickness L with mechanical curling near the external surface of header 1 until the gap between the header vessel and the heat-exchange tubes 4 is closed.

In order to ensure strength of the header 1 wall bridges 19 between holes 3 with fastened heat-exchange tubes 4 and leak-tightness of the said heat-exchange tube connections with the header, as well as to ensure more efficient use of the outer header surface perforated for tubing, it is required to properly select the outer diameter $D_{head}$ of the header in its central part (drilling area).

For this purpose, the following empiric relation is used:

$$2 \cdot \left[\frac{(d + 5.5) \cdot (n_1 + n_2)}{\pi} + 100\right] \leq D_{head} \leq$$
$$2 \cdot \left[\sqrt{2} \cdot (n_1 - 1) \cdot S_\Gamma + \frac{\sqrt{2}}{2} \cdot B_2 - \frac{\sqrt{2}}{4} \cdot (n_1 + n_2) \cdot S_\Gamma - R_\Gamma \cdot tg\left(\frac{\pi}{8}\right) + 100\right],$$

where: $S_h$ is the spacing between heat-exchange tubes in the horizontal heat-exchange bundle row, mm, $B_2$ is the width of the heat-exchange bundle opposite to the coolant header, mm, d is the outer heat-exchange tube diameter, mm, $n_1$ and $n_2$ indicate the quantity of tubes in the horizontal row of the smaller and bigger heat-exchange tube banks, accordingly, mm, $R_b$ is the minimum bend radius of the heat-exchange bundle tubes, mm.

Figure 2:
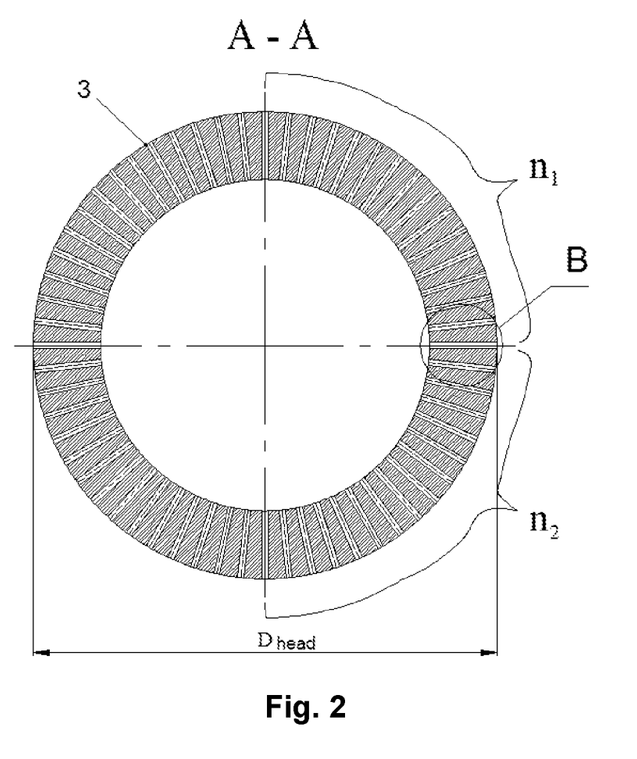
FIG. 2 shows a cross-section of the primary circuit coolant header vessel drilling area in the central cylindrical part of the header.
Figure 3:
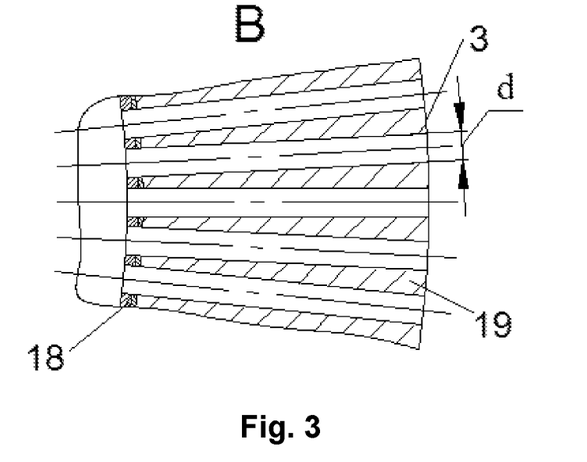
FIG. 3 shows a cross section detail of the primary circuit coolant header vessel drilling area.
Figure 4:
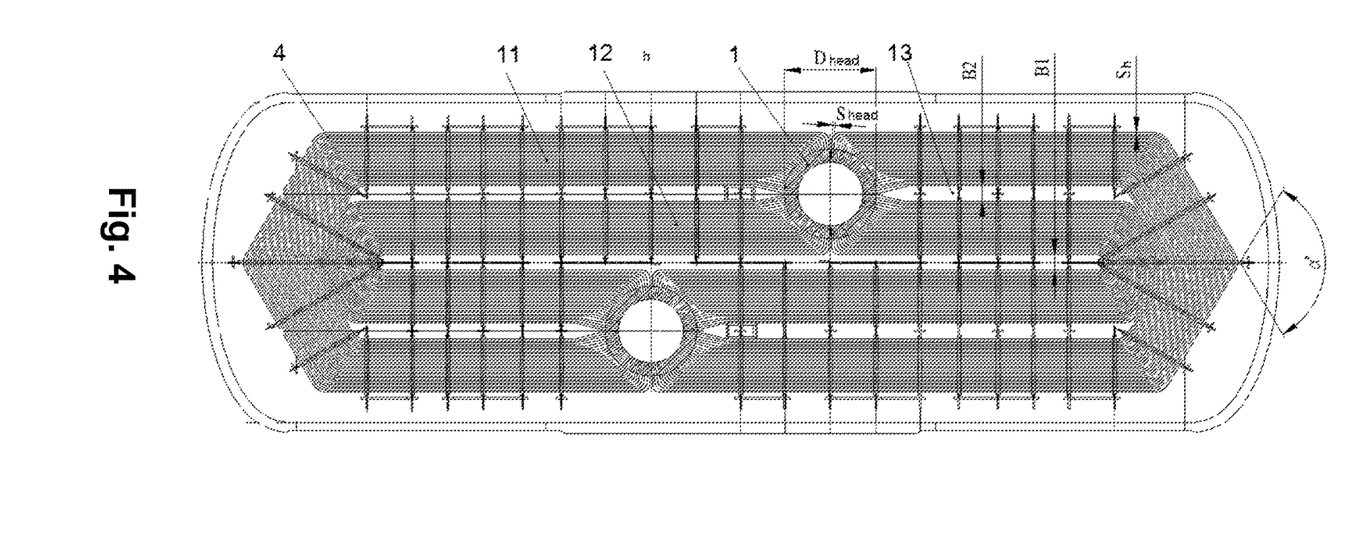
FIG. 4 shows a section of the steam generator assembly comprising two primary circuit coolant headers with U-shaped heat-exchange tubes grouped into banks and separated by vertical inter-tubular tunnels.
Figure 5:
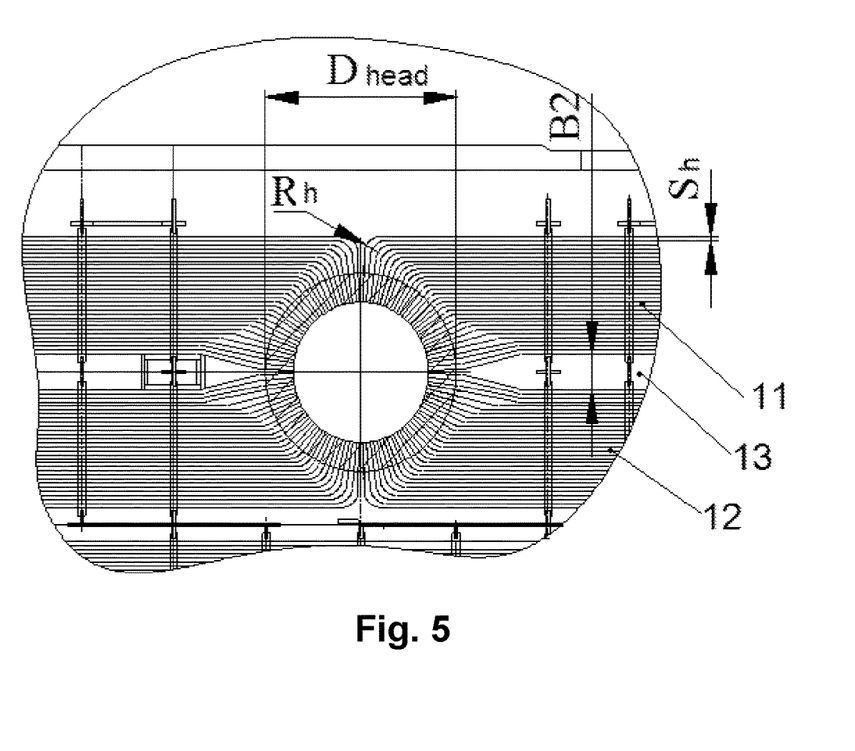
FIG. 5 shows a section detail of the coolant header with heat-exchange tubes inserted therein.
Figure 6:
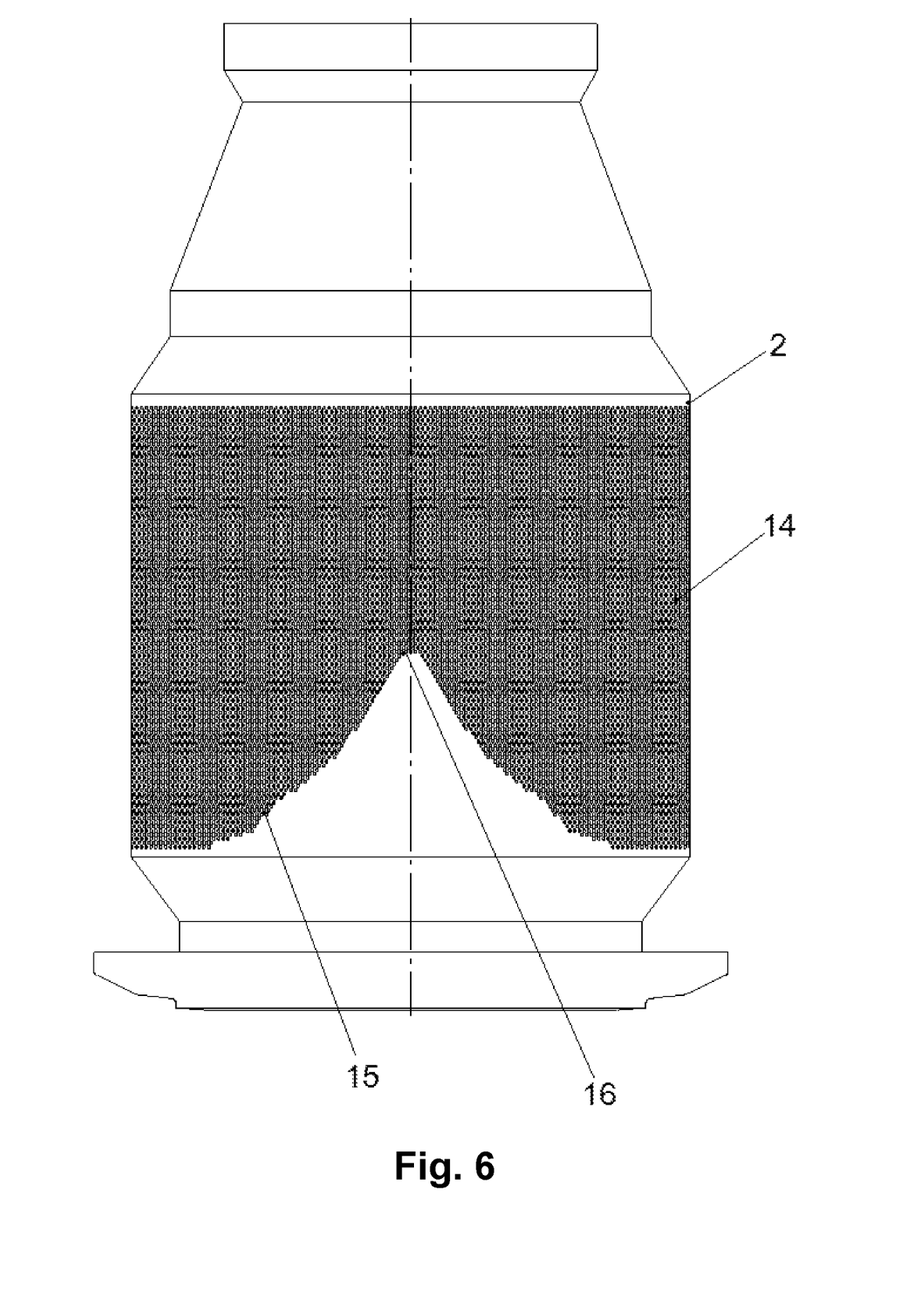
FIG. 6 shows a diametrical development of the primary circuit coolant header vessel.

Measurements of the correlation parameter are shown in FIGS. 2-4.

Holes 3 for fastening of heat-exchange tubes 4 are staggered in the central cylinder part of the header, and the distance between edges of the adjacent holes 3 shall not be less than 5.5 mm along the inner surface of the header. When header 1 is installed in steam generator vessel 7, the height of its drilling area 14 shall not exceed the arrangement limits set for the upper row of heat-exchange bundle tubes in the steam generator.

When the coolant header is assembled with a heat-exchange tube bundle to be inserted in the holes 3 drilled in the central part 2 of the header, heat-exchange tube bend radii shall be at least 60 mm, and preferably at least 100 mm to ensure eddy current testing and quality control of this assembly.

The claimed assembly is operated as part of the horizontal reactor plant steam generator of the nuclear power plant.

Primary coolant heated in the reactor is supplied to the inlet header 1 of the primary circuit coolant. From the inlet header 1, the coolant is supplied to heat-exchange tubes 4 grouped into bundles 11 and 12, passes through them while transferring the heat through the walls of heat-exchange tubes 4 to the secondary circuit coolant, i.e. to the boiler water, and is collected in the outlet or collecting header 20 of the primary circuit coolant. The coolant is returned to the reactor from the outlet header 20 by a circulating pump. The steam generator vessel 7 is filled with boiler water to a certain level above the heat-exchange tube bundle which is to be maintained during operation. Feed water is supplied to the steam generator through connection pipe 21 for feed water supply and the feed water input and distribution device. The feed water flowing out of it is mixed with the boiler water and heated to the saturation temperature. The heat transferred from the primary coolant is spent on boiler water evaporation and steam generation in the inter-tubular space of the steam generator. The generated steam is ascending to the separation part of the steam generator comprising a free volume, separation devices or a combination thereof. After passing the separation part of the steam generator, the steam has the design rated humidity. Then it is removed from the steam generator through steam removal devices comprising steam removal connection pipes 22 and overhead perforated sheets installed in front of them. The steam generated by the steam generator is further used in steam-power process cycle of electric power generation.

During steam generator operation, primary circuit coolant header connection with the U-shaped heat-exchange bundle tubes is the assembly which primarily requires assurance of inter-circuit density, as any loss of tightness leads to ingress of primary coolant radioactive water into the secondary circuit steam-water coolant circulating through the turbine and other structural components of the NPP reactor plant with potential radioactive substance release into the environment.

The claimed technical solution relating to the steam generator coolant header design with U-shaped tubes of horizontal heat-exchange bundle and its manufacture method establishes the following technical result: assurance of the guaranteed strength of the header wall bridges between the holes for fastening of heat-exchange tubes, leak-tightness of heat-exchange tube connections with the header assuming that the outer surface of the perforated header part is more efficiently used for tubing.

EXAMPLE 1

A steam generator is manufactured with in-line arrangement of tubes. The horizontal spacing between heat-exchange bundle tubes is $S_h = 27$ mm. To form a heat-exchange bundle, Ø18 mm heat-exchange tubes are used. The minimum bend radius of tubes is $R_b = 120$ mm. Number of heat-exchange tubes in a horizontal row of each bank is $n_1 = n_2 = 44$. The width of tunnels between tube banks is $B_1 = B_2 = 220$ mm.

$$D_{min} = \cdot \left[\frac{(d + 5.5) \cdot (n_1 + n_2)}{\pi} + 100\right] = 1517 \text{ mm},$$

$$D_{max} = 2 \cdot \left[\sqrt{2} \cdot (n_1 - 1) \cdot S_\Gamma + \frac{\sqrt{2}}{2} \cdot B_2 - \frac{\sqrt{2}}{4} \cdot (n_1 + n_2) \cdot S_\Gamma - R_\Gamma \cdot tg\left(\frac{\pi}{8}\right) + 100\right] = 1987 \text{ mm}.$$

If coolant header diameter D is less than 1517 mm, for instance, 1500 mm, horizontal spacing of tubes along the outer header surface will be:

$$S = \frac{\pi \cdot D}{2 \cdot (n_1 + n_2)} = \frac{\pi \cdot 1500}{2 \cdot (44 + 44)} = 26.78 \text{ mm}$$

In case of design pressure values specific to the primary circuit equipment of NPPs with VVER reactors, the header thickness will be 205 mm.

Therefore, the inter-tubular horizontal spacing along the inner header surface will be $$S_{in} = S \cdot \frac{D}{D + 2 \cdot 205} = 21 \text{ mm},$$

and the gap between the tubes within the header will be: $\delta = S_{in} - d = 21 - 18 = 3$ mm. If the gap between adjacent tubes is 3 mm, it will not be possible to scald them and technically manufacture a steam generator, as leak-tightness and strength of the heat-exchange tube connections with the primary circuit coolant header are not provided.

If the diameter exceeds 1987 mm for the part of heat-exchange bundle tubes it will not be possible to insert them into the holes of the perforate header part as the header side surface will cross over the bent tube section. Bent tube cannot be inserted into the hole. Subsequently, steam generator heat-exchange tube filling level, the area of the steam generator heat-exchange surface, its capacity, techno-economical and performance indices will be reduced.

The invention claimed is:

1. A steam generator primary circuit coolant header comprising:
   a horizontal heat-exchange bundle of U-shaped tubes, wherein the U-shaped tubes are grouped into banks and separated by vertical inter-tubular tunnels;
   a thick-wall welded vessel with a central cylindrical part perforated with holes configured for installation and fastening of the heat-exchange bundle therein, the central cylindrical part having a drilling area exceeding an area of holes by at least 20%,
   wherein a lower cylindrical part of the welded vessel is configured for welded connection with a steam generator vessel of the steam generator primary circuit,
   wherein an upper cylindrical part of the welded vessel comprises a conical adapter configured for flanged connection to a manhole with a lid, and
   wherein the primary circuit header has an outer diameter $D_{head}$ in the central cylindrical part configured in accordance with the following ratio:

$$2 \cdot \left[ \frac{(d+5.5) \cdot (n_1 + n_2)}{\pi} + 100 \right] \leq D_{head} \leq$$
$$2 \cdot \left[ \sqrt{2} \cdot (n_1 - 1) \cdot S_\Gamma + \frac{\sqrt{2}}{2} \cdot B_2 - \frac{\sqrt{2}}{4} \cdot (n_1 + n_2) \cdot S_\Gamma - R_\Gamma \cdot tg\left(\frac{\pi}{8}\right) + 100 \right]$$

where: $S_h$ is a spacing between U-shaped tubes in the horizontal heat-exchange bundle, mm,
   $B_2$ is a width of the heat-exchange bundle opposite to the coolant header, mm,
   d is an outer heat-exchange tube diameter, mm,
   $n_1$ and $n_2$ respectively indicate a quantity of tubes in the horizontal row of smaller
   and bigger heat-exchange tube banks, mm,
   $R_b$ is a minimum bend radius of the U shaped tubes, mm, and
   holes for fastening of heat-exchange tubes in the perforated central cylinder part of the header are staggered so that a distance between edges of a adjacent holes is not less than 5.5 mm.

2. A header according to claim 1, wherein the U-shaped tubes are seamless solid-drawn austenitic stainless steel pipes.

3. A header according to claim 1, wherein the U-shaped tubes of the heat-exchange bundle are grouped into banks separated by 100 to 250 mm wide vertical inter-tubular tunnels.

4. A header according to claim 1, wherein the flanged connection of the conical adapter to the manhole, with a lid, is equipped with a sealing gasket made of expanded graphite.

5. A header according to claim 4, wherein the sealing gasket of the flange connection comprises of pressed expanded graphite foil reinforced with a stainless steel strap.

6. A header according to claim 1, wherein holes of the perforated central cylindrical part includes a drilling area having holes there through, the drilling area limited at the bottom by a symmetrical wedge with a flat point.

7. A header according to claim 6, wherein the drilling area is limited at the bottom by a polyline in the shape of a wedge with a flat point, and a length of the flattened area is not less than $3 \cdot (d_{hole} + 6)$ mm, where $d_{hole}$ is the hole diameter.

8. A method of manufacture of a steam generator primary circuit coolant header with U-shaped tubes of a horizontal heat-exchange bundle, the method comprising:
   fabricating two complex forgings and U-shaped heat-exchange tubes,
   assembly and welding of the forgings,
   drilling holes in a header central cylindrical part such that a drilling area exceeds an area of holes by at least 20%,
   assembly of a heat-exchange bundle of U-shaped heat-exchange tubes by grouping the U-shaped tubes into banks separated by vertical inter-tubular tunnels,
   fastening each U-shaped tube in holes of a primary circuit header by rolling and welding on a header internal surface,
   wherein a primary circuit header outer diameter $D_{head}$ in the central part is selected based on the following ratio:

$$2 \cdot \left[ \frac{(d+5.5) \cdot (n_1 + n_2)}{\pi} + 100 \right] \leq D_{head} \leq$$
$$2 \cdot \left[ \sqrt{2} \cdot (n_1 - 1) \cdot S_\Gamma + \frac{\sqrt{2}}{2} \cdot B_2 - \frac{\sqrt{2}}{4} \cdot (n_1 + n_2) \cdot S_\Gamma - R_\Gamma \cdot tg\left(\frac{\pi}{8}\right) + 100 \right],$$

where: $S_h$ is a spacing between heat-exchange tubes in the horizontal heat-exchange bundle, mm,
   B2 is a width of the heat-exchange bundle opposite to a coolant header, mm,
   d is a outer heat-exchange tube diameter, mm,
   $n_1$ and $n_2$ respectively indicate a quantity of tubes in a horizontal row of a smaller
   and a bigger heat-exchange tube banks, mm,
   $R_b$ is a minimum bend radius of the heat-exchange bundle tubes, mm, and
   the drilled holes for fastening of heat-exchange tubes are staggered in the central cylindrical part of the header so that a distance between edges of the adjacent holes is not less than 5.5 mm.

9. A method according to claim 8,
   wherein the U shaped tubes are secured in the holes in the central part of the header by the steps of:
   round-welding of tube ends on inner surfaces of the headers,
   followed by hydraulic expansion of the U-shaped tubes, and
   mechanical curling near the external surfaces of the headers until a gap between the headers and the heat-exchange tubes is closed.

10. A method according to claim 8, further comprising arranging heat exchange bundles evenly from the bottom upwards with vertical gaps between adjacent tubes not exceeding the vertical spacing of tubes in the bundle.

11. A method according to claim 8, wherein during primary coolant header installation into the steam generator pressure vessel, a height of a drilling area does not exceed the arrangement limits set for the upper row of heat-exchange bundle tubes.

12. A method according to claim 8, wherein during fabricating, U-shaped tube bend radii are at least 60 mm, and preferably at least 100 mm.

13. A heat carrier header of a primary circuit of a horizontal steam generator for nuclear power plants, the heat carrier header comprising:
- a horizontal heat-exchange bundle of U-shaped tubes, wherein the U-shaped tubes are grouped into banks and separated by vertical inter-tubular tunnels; and
- a central cylindrical part comprising a drilling area exceeding an area of holes by at least 20%; an outer diameter $D_{head}$ of the central cylindrical part configured according to the following ratio:

$$2\left[\frac{(d+5.5)(n_1+n_2)}{n}+100\right] \le D_{head} \le$$
$$2\left[\sqrt{2}\,(n_1-1)S_\Gamma + \frac{\sqrt{2}}{2}B_2 - \frac{\sqrt{2}}{4}(n_1+n_2)S_\Gamma - R_\Gamma tg\left(\frac{n}{g}\right)+100\right]$$

where:
- $S_r$ is a pitch between heat exchange tubes in the horizontal row of a heat exchange bundle, mm;
- $B_2$ is a width of the heat exchange bundle duct located opposite the heat carrier header, mm;
- d is outer diameter of heat exchange tubes, mm;
- $n_1$ and $n_2$ is a number of tubes in a horizontal row of a smaller and a larger bundle of heat exchange tubes, respectively, mm;
- $R_r$ is a minimum bend radius of tubes in a heat exchange bundle, mm, wherein heat exchange tubes are arranged in the central cylindrical part of the header in staggered order so that the horizontal distance between edges of adjacent tubes on the inner surface of the header is at least 5.5 mm.

14. A header according to claim 13, further comprising a conical adapter to a manhole equipped with a sealing gasket of expanded graphite.

15. A header according to claim 13, wherein the sealing gasket comprises pressed expanded graphite foil reinforced with a stainless steel strap.

* * * * *

UNITED STATES PATENT AND TRADEMARK OFFICE
CERTIFICATE OF CORRECTION

PATENT NO. : 10,180,252 B2
APPLICATION NO. : 15/535371
DATED : January 15, 2019
INVENTOR(S) : Dmitriy Aleksandrovich Lakhov et al.

It is certified that error appears in the above-identified patent and that said Letters Patent is hereby corrected as shown below:

In the Claims

In Claim 8, Column 10, Line 37, "B2" should be as follows:
$B_2$ is a width of the heat-exchange bundle opposite to a Signed and Sealed this
Sixteenth Day of April, 2019

Andrei Iancu
*Director of the United States Patent and Trademark Office*